United States Patent [19]

Shimano

[11] 4,386,721
[45] Jun. 7, 1983

[54] FIXTURE FOR A WATER BOTTLE TO A BICYCLE FRAME

[75] Inventor: Keizo Shimano, Sakai, Japan

[73] Assignee: Shimano Industrial Company Limited, Osaka, Japan

[21] Appl. No.: 272,043

[22] Filed: Jun. 9, 1981

[30] Foreign Application Priority Data

Jun. 25, 1980 [JP] Japan .............................. 55-89766[U]

[51] Int. Cl.³ ............................................. B62J 11/00
[52] U.S. Cl. .................... 224/39; 224/30 R; 248/311.2; 248/313
[58] Field of Search ............ 224/30 R, 39, 35; 248/311.2, 313

[56] References Cited

U.S. PATENT DOCUMENTS

| | | | |
|---|---|---|---|
| 2,864,575 | 12/1958 | Stewart | 248/313 X |
| 3,033,403 | 5/1962 | Adell | 248/313 X |
| 3,212,660 | 10/1965 | Adell | 248/313 |
| 3,780,972 | 12/1973 | Brodersen | 248/313 |
| 4,009,810 | 3/1977 | Shook | 224/39 |
| 4,339,060 | 7/1982 | Braida, Jr. | 224/32 R |
| 4,345,704 | 8/1982 | Boughton | 224/39 |

*Primary Examiner*—Steven M. Pollard
*Attorney, Agent, or Firm*—Stevens, Davis, Miller & Mosher

[57] ABSTRACT

A fixture for mounting a water bottle on a bicycle frame which is provided with a fixing member fixed to the frame and a support member, the fixing member being provided with a pair of skirts which contact with both lateral sides of the water bottle supported by the support member and with both lateral sides of the frame, to cover gaps produced between the water bottle and the frame.

5 Claims, 8 Drawing Figures

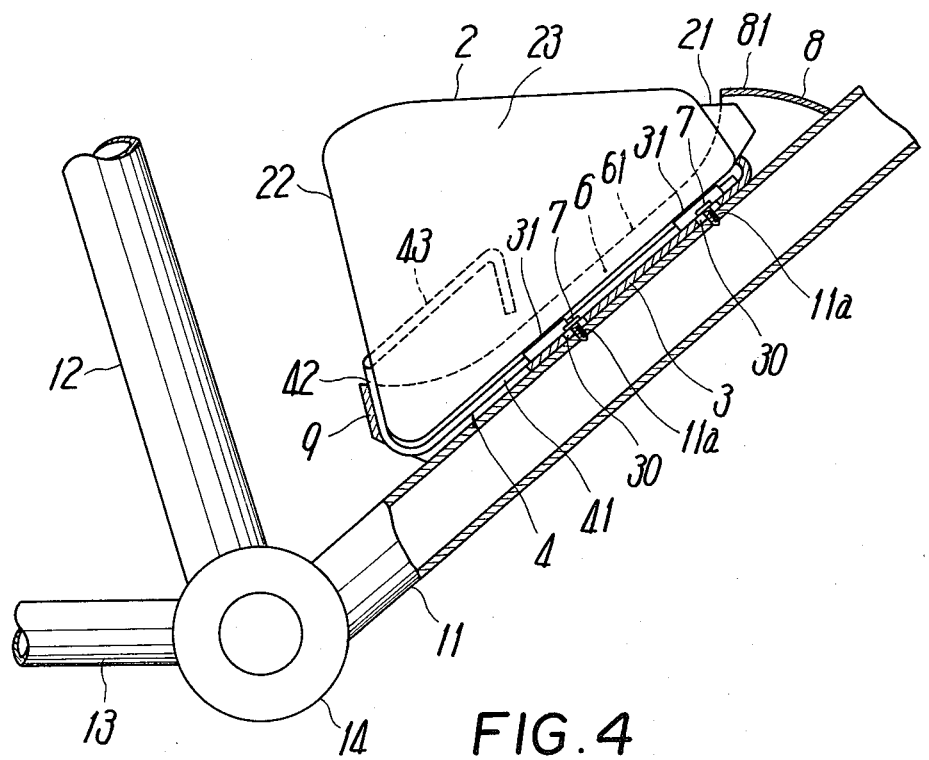
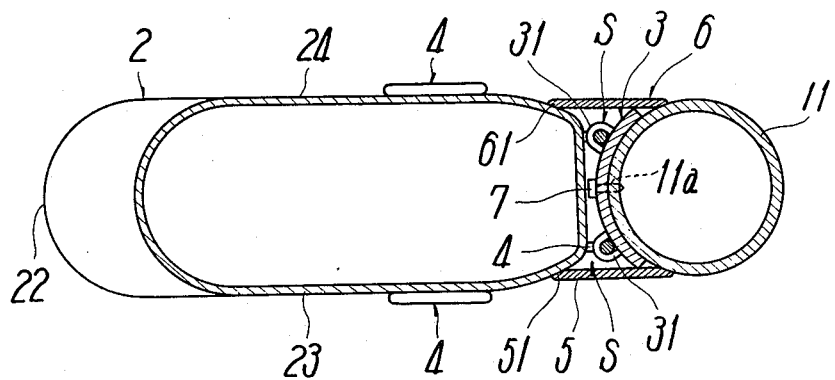

FIXTURE FOR A WATER BOTTLE TO A BICYCLE FRAME

FIELD OF THE INVENTION

This invention relates to a fixture for mounting a water bottle on a frame of a bicycle, and more particularly to a fixture for mounting a water bottle detachably on the frame, mainly on a down tube of the bicycle.

BACKGROUND OF THE INVENTION

Generally, a fixture for mounting a water bottle on a bicycle frame, such as a down tube, comprises a fixing member having a fixing means, the fixing member being fixed to the frame and carrying a support member made mainly from metallic wires. The fixing member is fixed to the frame through the fixing means and the water bottle detachably engages with the support member, thereby being mounted on the frame.

The water bottle is mainly cylindrical and has at the head thereof a faucet covered by a cap, which is mounted on the cylindrical frame through the fixture so that recessed gaps are produced between the water bottle and the frame, thereby creating a problem of increasing an air resistance against the bicycle's running.

In other words, during the bicycle's running, air flows from the front of the frame rearwardly along both sides thereof and then enters into the gaps to cause eddy air currents, the eddy air currents increasing the air resistance as a whole against the bicycle's running.

The air resistance will increase in proportion to the running speed of the bicycle to thereby hinder its running at high speed and inducing increased fatigue in a driver.

SUMMARY OF THE INVENTION

An object of the invention is to provide a fixture for mounting a water bottle on the bicycle frame, which can close recessed gaps produced between the water bottle and the bicycle frame carrying it, so that air, during the bicycle running, flows continuously smoothly along both sides of the frame and water bottle, thereby restricting to a minimum an air resistance against the bicycle's running.

This invention is characterized in that a fixing member, which has a support member for detachably supporting the water bottle, is provided with a pair of skirts in contact with both sides of the water bottle supported to the support member and with both sides of the bicycle frame carrying the water bottle, thereby covering recessed gaps produced between the water bottle and the frame.

The pair of skirts each mainly comprise a strip of a plate member and are integral with the fixing member or separate therefrom to be connected thereto. Alternatively, they are connected at the lengthwise front ends by a first connecting wall, or additionally at the lengthwise rear ends by a second connecting wall.

In either case, the skirts closing the aforesaid recessed gaps form the external surfaces including both sides of the frame and water bottle. Hence, a smooth air flow rearward of the bicycle during its running can be obtained which is free from the eddy air currents generated by the conventional bicycle water bottle.

Other objects and advantages of the invention will become apparent during the following discussion of the accompanying drawings, wherein:

BRIEF DESCRIPTION OF THE DRAWINGS

FIG. 3 is a sectional view taken on the longitudinal center line in FIG. 2, FIG. 4 is a sectional view taken on the line II—II in FIG. 2.

DETAILED DESCRIPTION OF THE INVENTION

Figure 2:
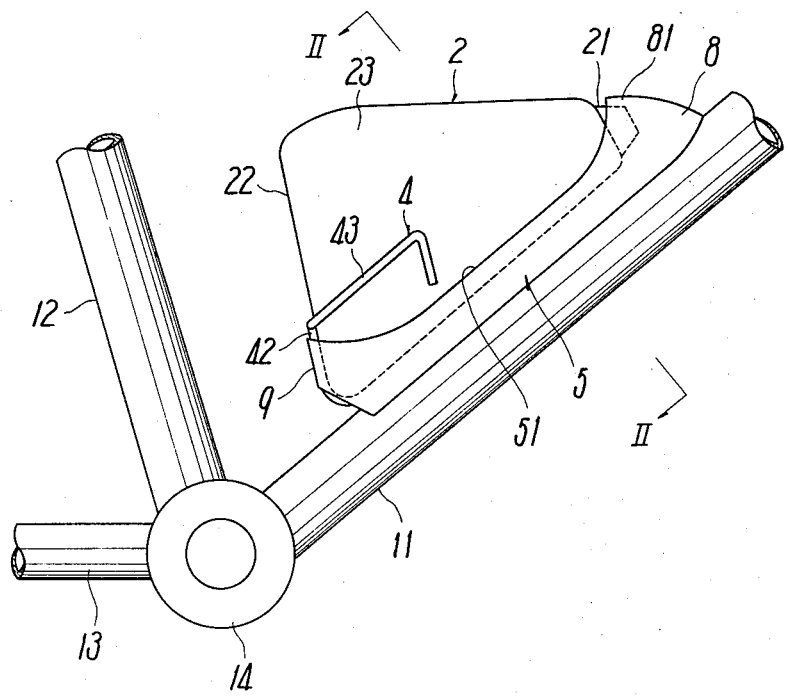
FIG. 2 is a side view of a water bottle mounted on the bicycle frame through the FIG. 1 fixture.

Referring to FIGS. 2 through 4, a fixture of the invention is detachably supported to the bicycle frame or, more specifically down tube 11. Reference numeral 12 designates a seat tube and 13 designates a chain stay, the down tube and seat tube 11 and 12 and chain stay 13, being connected at a bottom bracket 14 to constitute the bicycle frame. A water bottle 2 is mounted on down tube 11 and is substantially triangular in elevation and has a faucet (not shown) at the top and a cap 21 for the faucet. The water bottle 2, as shown in FIG. 4, is smaller in a thicknesswise length so as to be flat as a whole. In addition, the water bottle 2 may alternatively be formed, in elevation, in a square, diamond or trapezoid shape, and its longitudinally flat form can reduce its longitudinally projected area, thereby creating less air resistance against the water bottle 2 due to a combination of the water bottle with the fixture of the invention.

The water bottle 2 also preferably has a thicknesswise length coincident with an outer diameter of the frame, e.g., down tube 11, carrying the water bottle 2.

Figure 1:
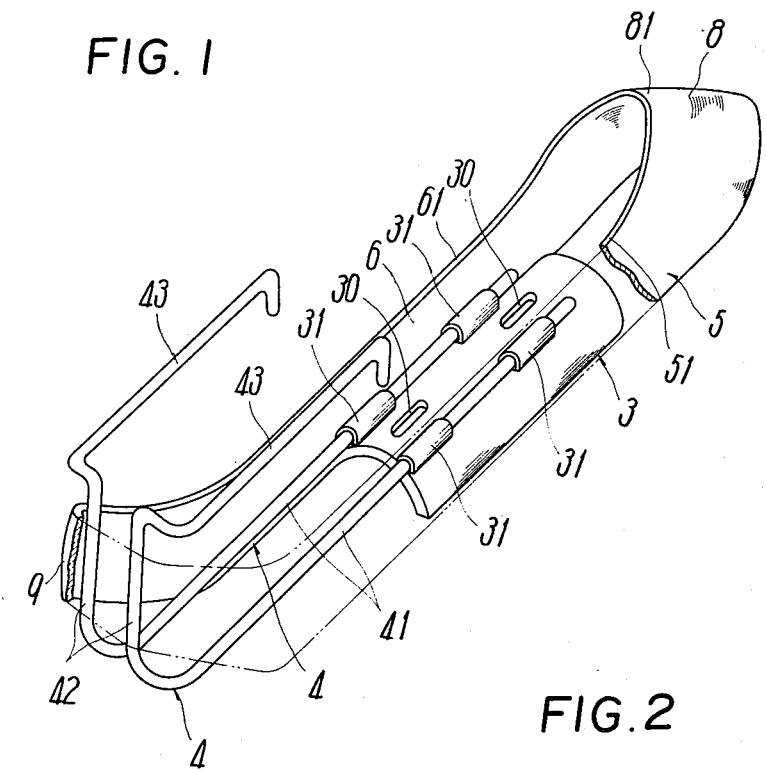
FIG. 1 is a partially omitted perspective view of an embodiment of a fixture of the invention.

The fixture of the invention, as shown in FIG. 1, comprises a fixing member 3 fixed to the bicycle frame, such as down tube 11, (the frame is hereinafter called the down tube), a support member 4 detachably engageably supporting water bottle 2, and a pair of skirts 5 and 6 covering recessed gaps S produced between the down tube 11 and the water bottle 2 supported to support member 4.

The fixing member 3 is formed of, for example, an elongate metallic plate bent in a curvature equal to that of the outer surface of down tube 11 and provided at the central portion of its width two elongate slots 30 extending lengthwise of fixing member 3 and at both widthwise sides of each slot 30 with tubular engagements 31 punched from fixing member 3 and for retaining support member 4.

Also, the fixing member 3 is fixed to down tube 11 through headed screw bolts 7 screwable with threaded bores 11a provided at down tube 11 respectively.

The support member 4 is formed mainly of a bent metallic wire. In FIGS. 1 through 4, a pair of support members 4 each comprise a straight portion 41 along the down tube 11, a rising portion 42 rising upwardly from the rear end of straight portion 41, and an engaging portion 43 engageable with water bottle 2, the engaging portion 43 bending outwardly from the upper end of rising portion 42 and then extending forwardly and further bending downwardly at the front end. The straight portions 41 are inserted at the utmost ends thereof into engagements 31 to secure support member 4 to fixing member 3.

The support members 4 are spaced at an interval sightly smaller than a thicknesswise length of water bottle 2. The water bottle 2, as shown in FIGS. 2 and 3, contacts at the bottom wall 22 with rising portions 42 and engages at the side walls 23 and 24 with engaging portions 43, thereby being elastically held to support member 4 and mounted on down tube 11 through skirts 5 and 6 to be hereinafter described. The water bottle 2 is disengagable from engaging portions 43 and is therefore removable from down tube 11. A driver pushes by his hand inwardly the side walls 23 and 24 of water bottle 2 to pump out a beverage contained therein for consumption.

Next, the skirts 5 and 6, the important elements of the invention, will be detailed.

The skirts 5 and 6 each comprise a strip of a plate member of a given length along the down tube 11 and are made mainly from synthetic resin. If the fixing member 3 is made from a metallic plate, the respective skirts 5 and 6 are separate from the fixing member 3 and attached thereto through welding, fitting or screwing by screws.

Also, the skirts 5 and 6, as shown in FIG. 4, each contact with the lateral surfaces of water bottle 2 supported to support member 4 and of down tube 11, thereby covering recessed gaps produced between the water bottle 2 and the down tube 11.

Accordingly, the skirts 5 and 6 connect the lateral surfaces of down tube 11 and water bottle 2, so that when the bicycle carrying water bottle 2 at down tube 11 is driven, a smooth air flow proceeds from the front of down tube 11 rearwardly along the lateral surfaces of both the down tube 11 and water bottle 2 to thereby generate no air eddy current and to minimize the air resistance against the bicycle's running.

The skirts 5 and 6 shown in FIGS. 1 through 4 are provided at the lengthwise front ends with a first connecting wall 8 for connecting skirts 5 and 6 and at the lengthwise rear ends with a second connecting wall 9 for connecting the same, thereby having a trapezoid shape as a whole. Receiving seats 51 and 61, as shown in FIG. 4, are provided for receiving the side walls 23 and 24 of water bottle 2 at their mounting sides to down tube 11.

The trapezoidal skirts 5 and 6 together with connecting walls 8 and 9 can close gaps S produced between the down tube 11 and the water bottle 2, thereby further effectively restricting the air resistance.

In the above construction, it is preferable to bend the first connecting wall 8 into a circular arc, and more preferable to upwardly expand the first connecting wall 8 and form a cover 81 for covering cap 21 as shown in FIGS. 2 and 3.

This invention is not limited to the aforesaid embodiment, but is also applicable to the following modified embodiments.

Figure 5:
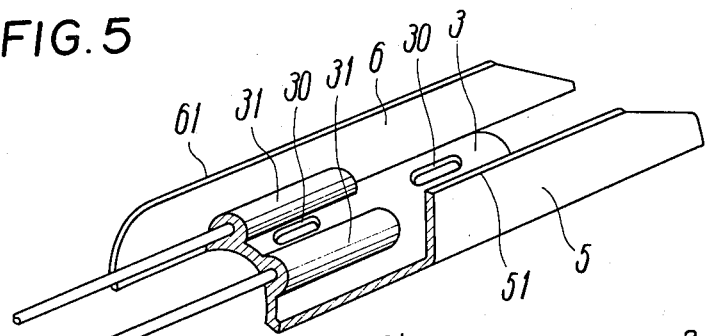
FIG. 5 is a partially cutaway perspective view of a modified embodiment of the invention.
Figure 6:
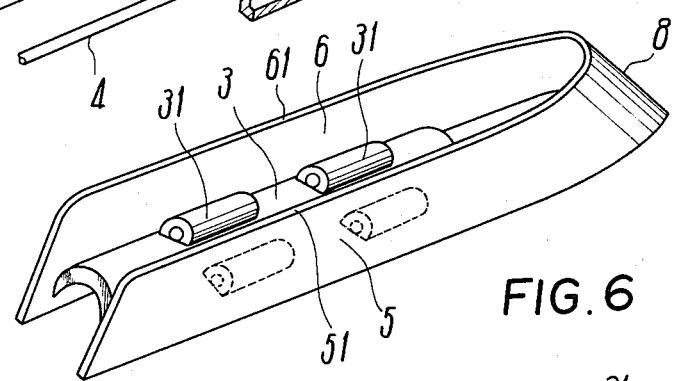
FIG. 6 is a partially omitted perspective view of another modified embodiment of the invention.

(1) The fixing member 3 and skirts 5 and 6, as shown in FIGS. 5 and 6, are integrally molded of synthetic resin.

(2) The skirts 5 and 6, as shown in FIG. 5, are separate from each other, open at the lengthwise front ends and rear ends, and integral with fixing member 3.

(3) The skirts 5 and 6, as shown in FIG. 6, are connected only at the lengthwise front ends by connecting wall 8.

(4) The fixing member 3 has a socket (not shown) for water bottle 2.

Figure 7:
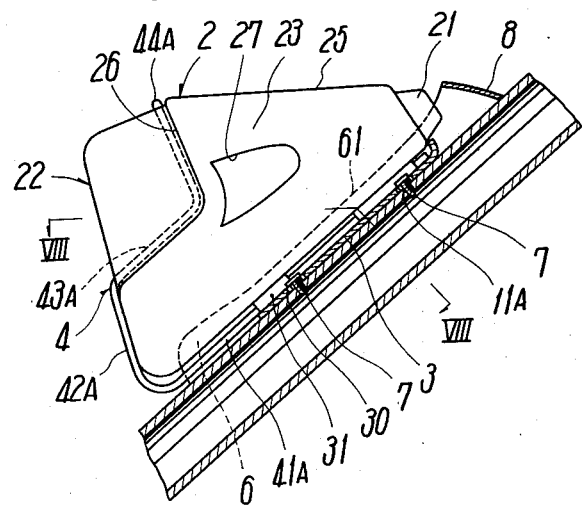
FIG. 7 is a sectional view corresponding to FIG. 3, with a different support member.
Figure 8:
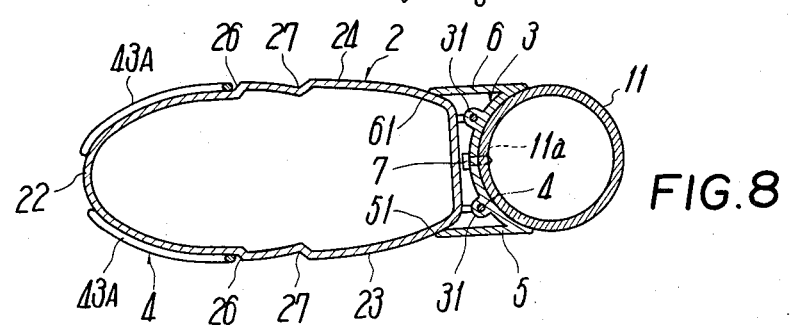
FIG. 8 is a sectional view taken on the line VIII—VIII in FIG. 7.

(5) The support member 4 is constructed as shown in FIGS. 7 and 8.

In detail, the support member 4 shown in FIGS. 7 and 8 comprises; a pair of straight portions 41A extending along down tube 11; a pair of rising portions 42A rising from the rear ends of straight portions 41A; a pair of engaging portions 43A which bend slightly outwardly from the upper ends of rising portions 42A, forwardly extend, and upwardly bend at the utmost ends, thereby engaging with the lateral surfaces 23 and 24 of water bottle 2 respectively; and a connecting portion 44A which connects engaging portions 43A to engage with the upper surface 25 of water bottle 2. The water bottle 2 engages at the upper surface thereof with connecting portion 44A to be elastically pressed against the receiving seats 51 and 61 at skirts 5 and 6.

In addition, in FIGS. 7 and 8, reference numeral 26 designates recesses formed at the lateral sides 23 and 24 and the upper surface 25 and along the engaging portions 43A and connecting portion 44A, the recesses 26 being adapted to engage with the engaging portions 43A and connecting portion 44A respectively. Reference numeral 27 designates recesses provided at both the lateral sides of water bottle 2, which facilitate pumping for taking-out a beverage from the water bottle 2.

In addition, the support member 4 is not limited to the construction shown in FIGS. 1 through 4 and 7, but may have other constructions.

As many apparently widely different embodiments of this invention may be made without departing from the spirit and scope thereof, it is to be understood that the invention is not limited to the specific embodiments thereof except as defined in the appended claims.

What is claimed is:

1. A fixture for mounting a water bottle on a bicycle frame comprising:
   (a) a fixing member fixed to said frame;
   (b) a support member supported to said fixing member and detachably engaging with said water bottle to support said water bottle; and
   (c) a pair of skirts mounted on said fixing member and contacting with both lateral surfaces of said water bottle supported to said support member and both lateral surfaces of said frame to thereby cover recessed gaps produced between said water bottle and said frame.

2. A fixture for a water bottle according to claim 1, wherein each of said skirts comprises a plate strip extending lengthwise of and along said frame which has at its lengthwise front end a connecting wall for connecting each of said skirts, said connecting wall having a surface which is curved in a circular arc.

3. A fixture for a water bottle according to claim 1, wherein each of said skirts comprises a plate strip extending lengthwise of and along said frame which has at its lengthwise front and rear ends a first connecting wall and a second connecting wall, which connect each of said skirts.

4. A fixture for a water bottle according to claim 2 or 3, wherein said connecting wall connecting the front ends of said skirts has a cover for covering a cap covering a faucet of said water bottle.

5. A fixture for a water bottle according to claim 1, wherein each of said skirts has a receiving seat which receives said water bottle at a side thereof which is mounted on said frame.

* * * * *